Jan. 23, 1934.   A. BRUNE ET AL   1,944,213
VEHICLE COUPLER
Filed April 30, 1932
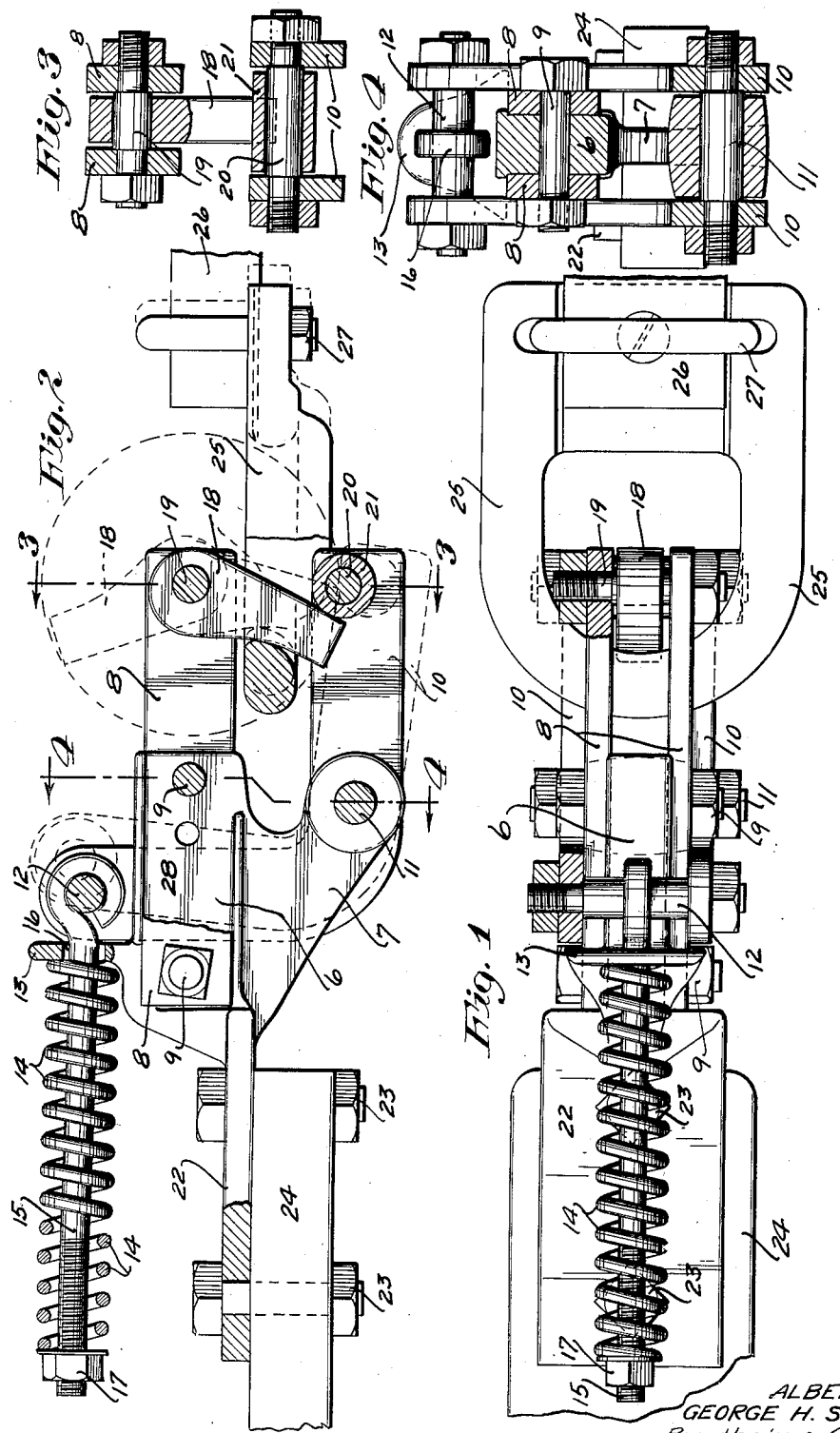
Inventors
ALBERT BRUNE
GEORGE H. STERLING
By their Attorneys Patented Jan. 23, 1934

1,944,213

UNITED STATES PATENT OFFICE 1,944,213

VEHICLE COUPLER

Albert Brune, Albert Lea, and George H. Sterling, Minneapolis, Minn.

Application April 30, 1932. Serial No. 608,423

2 Claims. (Cl. 280—33.16)

Our invention provides an improved vehicle hitch which, in its main features, provides what is known as a safety hitch, that is, one that will release under abnormal strain but which, as a secondary feature, may be readily converted into a positive or non-self-releasing hitch. A safety hitch or one that will release under abnormal strain, is desirable for example, to couple plows to tractors, while for coupling trailers to trucks or automobiles, a positive or non-releasing hitch is required. The chief novelty of the invention resides in the construction and arrangement that make the device a safety hitch. The objects accomplished by the invention are simplicity of construction, reliability in action, strength and durability, with certain other features that are incident to the above noted objects.

A commercial form of the coupler is illustrated in the accompanying drawing wherein like characters indicate like parts throughout the several views.

Referring to the drawing:

Fig. 1 is a plan view of the improved coupler, some parts being shown in horizontal section;

Fig. 2 is a side elevation of the coupler with some parts sectioned;

Fig. 3 is a transverse section taken on the line 3—3 of Fig. 2; and

Fig. 4 is a transverse section taken on the line 4—4 of Fig. 2.

The chief elements of the coupler are a coupler head, a lock dog pivoted to the coupler head for complete rotation, and a lock dog abutment carried by the coupler head and with said parts arranged so that normally the abutment holds or restrains the lock dog against releasing movement but will yield and release the lock dog under abnormal strain.

A coupler head, indicated as an entirety by the character 6, is shown as provided with a depending hinge lug 7 and with a projecting lock dog supporting arm shown as made up of parallel metal bars 8 rigidly secured to the head 6 by nut-equipped bolts 9. An abutment-supporting arm shown as made up of laterally spaced parallel metal bars 10, is pivotally connected to the hinge lug 7 by a nut-equipped bolt 11 or the like. These bars 10 as here shown, are L-shaped and provided with upwardly extended end portions tied together by a nut-equipped stud 12 and arranged to be normally held against a stop flange or lug 13 formed on the top of the coupler head 6.

In this particular arrangement, and with the rear ends of the bars 10 turned upward, a horizontally disposed coil tension spring 14 is connected to the bars 10 by means of a nut-equipped tension bolt 15. This bolt 15 is extended through a hole 16 in the flange 13 and its eye or curved end is directly applied on the bolt 12. At its threaded end, the bolt 15 is provided with a nut 17. The spring 14 is applied around the bolt 15 and is compressed between the nuts 17 and flange 13 and exerts tension or strain on the arm formed by the bars 10 which keeps the extended lower end portion thereof in a raised position shown by full lines in Fig. 2.

The lock dog shown in Figs. 1 to 4, inclusive, is a single-ended dog 18 located between the extended ends of the arm-forming bars 8 and pivoted on a nut-equipped bolt or pin 19 passed through the extended end of said bars 8. The lock dog abutment shown is in the form of a nut-equipped bolt or pin 20 extended between and rigidly secured to the extended lower ends of said bars 10 and provided with a loose roller 21. Normally, the free end of the dog 18 will be gravity held against the inner face of the roller 21, as shown by full lines in Fig. 2, and will be locked or restrained against outward swinging movements.

In the arrangement illustrated in the drawing, the coupler head 6 is provided with an anchoring flange or plate 22 that is rigidly secured by nut-equipped bolts 23 to a plow-beam or bar 24; and a heavy clevis or yoke 25 is rigidly secured to a part of a tractor such as a tractor draw-bar 26, by means of a nut-equipped U-bolt 27 or the like. Obviously, the arrangement might be reversed, that is, the coupler head secured to a part of the tractor and clevis 25 to a part of the plow structure.

As is evident, a clevis 25 is adapted to be positioned between the upper arm 8 and lower arm 10 of the coupler. When the clevis is forced into the opening between said arms, it will press back the dog 18 until the dog has been cleared and then the dog will be dropped into locking position against abutment roller 21, and will then hold the clevis against outward or retracting movement. When draft strain is put upon the locked dog 18, the pressure on the roller 21 will tend to move the same and the free end of the arm 10 downwardly, but such movement will be resisted by the spring 14. The tension of the spring 14, may, of course, be varied by adjustments of the nut 17.

In practice, for drawing plows, it should be so set that the dog 18 will not release the clevis and permit uncoupling of the plow from the tractor under all normal strains, that is, all strains that will be put upon the coupler in the ordinary plowing actions, but will release the dog and permit uncoupling of the plow from the tractor if abnormal strains, such as running the plows against a large rock or roots, or generally any such strains that would be liable to break the plows or couplers or other parts, are encountered. It is important to note, however, that a certain initial movement of the dog 18 under the tension of the spring is permitted before and without producing a release of the dog so that there would be a cushioning but non-releasing action when the plow has encountered minor obstructions which produce a somewhat increased strain, but not sufficient to unduly strain or break any of the parts.

It is now highly important to note that the lock dog is capable of complete rotation so that it is moved from one locked position through a releasing position, back to locking position by a continued rotation in a constant direction. In action, when the dog is released by strains produced thereon through the clevis 25, it will be given such momentum that it will be automatically thrown upward and then backward and downward again into locked position against the abutment roller 21. Of course, the instant the dog passes the roller 21, spring 14 will restore the movable parts of the coupler to normal position with the roller 21 positioned to intercept and again lock the dog 18 in the normal position shown by full lines in Fig. 2. The lock dog will, therefore, seldom need to be hand restored to locking position, but if it should stop before it has been turned completely over, it may be readily turned over and restored to locked position. It should be noted also that the cushioning action above referred to which has taken place under minor or non-releasing strains, will also cushion the initial shock produced by major or coupler-releasing strains.

With the rear ends of the bars 10 turned upward and with the spring 14 and bolt 15 horizontally disposed, no part of the coupler is projected any considerable distance above the top of the coupler head and this is desirable in many instances. However, if the ends of the bars 10 are not turned upward, a spring and its bolt would, as is obvious, be applied thereto in a vertical arrangement.

When the coupler is used for example for coupling a trailer to a truck or other vehicle, or whenever an automatic releasing action is not desired, the coupler can be made rigid and non-releasing simply by inserting the pin or bolt through a hole 28 provided in the coupler head, shown in Fig. 2.

From the foregoing, it is evident that the device described is capable of various modifications as to details of construction and arrangement of parts all within the scope of the invention herein disclosed and broadly claimed.

What we claim is:

1. A coupler comprising a coupler head having vertically spaced arms, one of which is movable in respect to the other, a lock abutment on the lower arm, a lock dog pivoted at one end to and gravity-suspended from the upper arm and normally engageable with and restrained by said lock abutment, but capable, when released, of complete rotation in a vertical plane from locked position through releasing position and back to locked position against said abutment where it will be gravity held in operative position, and a yielding tension device normally holding said abutment in lock-restraining position.

2. The structure defined in claim 1 in which said upper arm is formed by parallel bars rigidly secured to said head and between which said lock dog is arranged to work and in which said lower arm is a movable arm formed by parallel bars pivotally connected to said head and subject to said yielding tension device, and in which said abutment is secured to and between the free ends of said bars.

ALBERT BRUNE.
GEORGE H. STERLING.